(12) United States Patent
Salviato et al.

(10) Patent No.: US 6,294,092 B1
(45) Date of Patent: Sep. 25, 2001

(54) CONTAINER

(75) Inventors: Jean-Yves Salviato, Les Bons Villers (BE); Colin Marshall, Wigton (GB); Darren Nash, Bridgwater (GB); Lesley Sealby, Cockermouth (GB)

(73) Assignee: UCB, S.A., Brussels (BE)

( * ) Notice: Subject to any disclaimer, the term of this patent is extended or adjusted under 35 U.S.C. 154(b) by 0 days.

(21) Appl. No.: 09/381,204

(22) PCT Filed: Mar. 13, 1998

(86) PCT No.: PCT/BE98/00034

§ 371 Date: Feb. 23, 2000

§ 102(e) Date: Feb. 23, 2000

(87) PCT Pub. No.: WO98/41314

PCT Pub. Date: Sep. 24, 1998

(30) Foreign Application Priority Data

Mar. 17, 1997 (GB) .................................... 9705454

(51) Int. Cl.⁷ ............................ B01D 61/74; B01D 71/54
(52) U.S. Cl. .......................... 210/644; 210/490; 426/504; 426/402; 426/425
(58) Field of Search ............................... 210/644, 500.41, 210/500.29, 490; 426/506, 402, 425; 99/495; 428/34.3, 34.6, 34.7, 34.8, 35.2, 35.6; 604/92

(56) References Cited

U.S. PATENT DOCUMENTS

| 3,648,845 | * | 3/1972 | Riley . |
|---|---|---|---|
| 3,858,499 | * | 1/1975 | Scott . |
| 4,534,355 | | 8/1985 | Potter . |
| 4,645,698 | * | 2/1987 | Matsubara . |
| 4,781,837 | * | 11/1988 | Lefebvre . |
| 4,920,105 | * | 4/1990 | Zelman . |
| 4,985,017 | * | 1/1991 | Theeuwes . |
| 5,098,566 | * | 3/1992 | Lefevre . |
| 5,294,342 | | 3/1994 | Donato . |
| 5,382,365 | * | 1/1995 | Debaly . |
| 5,529,690 | | 6/1996 | Pashley et al. . |

FOREIGN PATENT DOCUMENTS

| 0 121 099 | 10/1984 | (EP) . |
|---|---|---|
| 0 360 612 | 3/1990 | (EP) . |
| WO88/02653 | 4/1988 | (WO) . |

* cited by examiner

*Primary Examiner*—Ana Fortuna
(74) *Attorney, Agent, or Firm*—Wenderoth, Lind & Ponack, LLP

(57) ABSTRACT

A container comprising a flexible semi-permeable composite membrane structure is described, as well as its applications. The membrane has a low molecular weight cut-off, comprises a flexible support layer thick enough to give strength to the membrane structure and having a relatively high molecular weight cut-off and, on at least one surface of the said support layer, a second layer having a relatively low molecular weight cut-off and is thin enough to allow a workable flux. Said container may be used for the preparation of rehydrated solute solutions, rehydrated blood or blood substitutes, nutritional solutions, solutions for medical purpose or of pure water.

10 Claims, No Drawings

CONTAINER

FIELD OF THE INVENTION

The present invention is related to a new container useful for the preparation of rehydrated solute solutions, of rehydrated blood products, of nutritional solutions, of solutions for medical purpose or of pure water, comprising a semi-permeable membrane material with a low molecular weight cut-off, to its use in a process of osmotically driven filtration and for the manufacture thereof.

BACKGROUND OF THE INVENTION

In view of its intended uses, the wall of a container (or a portion thereof) useful for the preparation of rehydrated solute solutions, of rehydrated blood products, of nutritional solutions, of solutions for medical purposes or of pure water by osmotically driven filtration, consists generally in a semi-permeable membrane.

Thus, a semi-permeable membrane needs to be strong, relatively inert and capable of separating compounds with different molecular weights. A semi-permeable membrane structure is characterized by its molecular weight cut-off (MWCO) defined by the molecular weight at which 90% of the solute will be prevented from permeating through the membrane. Since the permeability of a membrane with a given molecular weight cut-off is proportional to its thickness, the lower the molecular weight cut-off, the lower the thickness of the membrane must be to maintain practical flux rates. However, the thinner this membrane becomes, the lower its strength. On the other hand, the higher the molecular weight cut-off, the more the phenomenon of dialysis can interfere with osmosis. Moreover, the lower the molecular weight cut-off, the more selective the semi-permeable membrane. There are thus advantages of working with a molecular weight cut-off as low as possible while maximizing flux rate.

STATE OF THE ART

The European Patent EP 360612 discloses a process wherein an accurately controlled mixture of low molecular sugar and electrolyte salts, which together form the basis of an oral rehydration treatment, is retained into a leak proof container constructed from a semi-permeable membrane which may be of cellulose, regenerated cellulose, benzoylated cellulose, viscose cellulose and collagen. This membrane has a molecular weight cut-off below the molecular size of microorganisms or enterotoxins of *V. Cholerae* and *Shigella* species so that when the container and contents are placed into water containing the said contaminants, a process of osmosis takes place where water free from contaminants is drawn into the container, but where the passage of micro-organism into the container is prevented, resulting in a sterile oral rehydration solution inside the container. In this disclosure, the concentration of the sterile content of the container is controlled by achieving an equilibrium between the osmosis and dialysis of the sugars and electrolytes into the external water. Therefore, the final concentration of solution is dictated by the quantity of solute within the container and the volume of external water. The disadvantages of this system are an expensive loss of solute, the growth of bacteria in the external water due to sugars (nutrient) feeding, the need to precisely control the volume of external water and the low efficiency of the device, i.e. amount of water taken up in a given period being low due to dialysis of solute.

Aims of the Invention

The present invention aims to provide a container which does not present these drawbacks. The aim of the invention is to provide a container comprising a flexible membrane structure, wherein the membrane has a low molecular weight cut-off (allowing to eliminate or minimize the dialysis of solutes) and has an increased selectivity.

As lowering the molecular weight cut-off of the membrane results in a severe decrease in speed of operation of the device, reducing the thickness of the membrane to compensate for the reduction in speed results in an impracticably weak structure. It is therefore an aim of the present invention to provide a container comprising as membrane, a thick and strong film with a relatively high average pore diameter and number as a support for a thin layer with a relatively low molecular weight cut-off. This enables one to tune the selectivity of the composite membrane structure whilst maximizing flux.

It is a further aim of the present invention to substantially reduce dialysis which enables solutions of concentrations within the required tolerance to be obtained in a shorter period of time without the need for the precise measurement of the outer volume of water, by means of a container comprising a membrane having a first layer with very large pores which can be utilized as a support for a thin polymeric layer coated onto the surface of the first layer. The resultant reduction of dialysis also leads to considerably lower increase in external water bacteria count.

A further aim of the invention is to provide a device allowing the preparation of rehydrated solute solutions, of rehydrated blood products, of nutritional solutions, of solutions for medical purpose or of pure water into a closed container, especially in conjunction with the process of osmotically driven ultrafiltration as described in the European Patent No. 360612. It is however to be noted that the container according to the invention may be efficiently placed into flowing water (stream, river and the like) or into stagnant water (lake, pool and the like).

Description of the Invention

The invention is related to a container for the preparation of rehydrated solute solutions, rehydrated blood or blood substitutes, nutritional solutions, solutions for medical purpose or of pure water comprising a flexible semi-permeable composite membrane structure having a low molecular weight cut-off and at least one water soluble solid contained therein, which membrane comprises a flexible support layer thick enough to give strength to the membrane structure and having a relatively high molecular weight cut-off and on at least one face of the said support layer, a second layer having a relatively low molecular weight cut-off and being thin enough to allow a workable flux.

By container, it is to be understood a closed structure; for example in the form of a bag or a pouch.

By flexible membrane is understood a structure which is capable of further shaping and which is also flexible, either prior or after being brought in contact with water.

By thick enough to give strength to the membrane structure, it is to be understood that the membrane should be strong enough to prevent damages when both dry or swollen with water. By thin enough to allow a workable flux, it is to be understood that the flux should be at least 0.1 l/h.m2.bar.

The molecular-weight cut-off of the two layers to be chosen may vary within a large range.

The MWCO of the support layer is chosen in order to allow a high flux and yet to prevent the passage through the membrane of microorganisms from the outside water. One may thus select for the support layer, a film which has relatively large pores, for examples of between 2 and 20 nm of diameters. On the other hand, the MWCO of the second layer is chosen in order to prevent dialysis of low molecular weight solutes. The pore size of the support layer can thus be many times that of the second layer. Preferably, the molecular weight cut-off of the support layer is from 1,000 to 50,000 and/or the molecular weight cut-off of second layer is from 300 to 2,000.

As a matter of fact, it is to be noted that the entering flux of water is lowered by the thin second layer. The flux for a simple regenerated cellulose film is from 1.7 to 3 l/h.m2.bar and may be as low as 0.1 l/h.m2.bar for the composite film of the invention. However, surprisingly, for the composite films of the invention, as the dialysis (thus the coming out flux) is even more decreased, the resulting flux is positive and considerably increased. The relative thickness of the components of the composite membrane structure will be determined by the required flux rate and strength.

Preferably, the overall thickness of the composite membrane is from 20 to 50 $\mu$m; the thickness of the support layer is from 19 to 48 $\mu$m and the thickness of the second layer is from 0.1 to 2.0 $\mu$m.

The support layer can be selected from a wide variety of materials including cellulose, regenerated cellulose (CELLOPHANE®, cuprammonium cellulose), benzoylated cellulose and collagen.

The preferred material for the support layer is regenerated cellulose. The support layer may be produced by one or several known manufacturing methods, such as xanthate, cuprammonium, carbamate or organic solvent (e.g. NMMO) processes when a regenerated cellulose material is used.

The second layer can be composed of cellulose derivatives (e.g. ethers, esters, nitrocellulose, etc.), synthetic organic polymers (e.g. polyacrylic ester, polyvinyl acetate copolymers, polyurethanes, aliphatic polyamides such as nylon 6, nylon 6.6, nylon 4.6, polysulfone and polyethersulfone and the like), modified or unmodified naturally occurring polymers (e.g. starches, proteins, etc.). Mixture of these with or without the addition of inorganic additives (e.g. fumed silica) can also be used.

However, the most interesting results have been obtained with polyurethanes conventionally used for covering textile with a protective waterproof but water vapor permeable coating. It is particularly surprising that a waterproof membrane may be used to filter aqueous medium.

Hydrophilic polyurethanes which may be used according to the invention as preferred material for the second membrane are the reaction product of (a) polyisocyanates; and (b) polyols containing at least two isocyanate reactive groups; and (c) optionally an active hydrogen-containing chain extender.

Suitable polyisocyanates comprise aliphatic, cycloaliphatic, or aromatic polyisocyanates. As examples of suitable aliphatic diisocyanates, there may be mentioned 1,4-diisocyanatobutane, 1,6-diisocyanatohexane, 1,6-diisocyanato-2,2,4-trimethylhexane and 1,12-diisocyanatododecane either alone or in admixture. Particularly suitable cycloaliphatic diisocyanates include 1,3- and 1,4-diisocyanatocyclohexane, 2,4-diisocyanato-1-methylcyclohexane, 1,3-diisocyanato-2-methylcyclohexane, 1-isocyanato-2-(isocyanatomethyl) cyclopentane, 1,1'-methylenebis[4-isocyanatocyclohexane], 1,1'-(1-methylethylidene)bis[4-isocyanatocyclohexane], 5-isocyanato-1-isocyanatomethyl-1,3,3-trimethylcyclohexane (isophorone diisocyanate), 1,3- and 1,4-bis(isocyanatomethyl)cyclohexane, 1,1'-methylenebis [4-isocyanato-3-methylcyclohexane], 1-isocyanato-4(or 3)-isocyanatomethyl-1-methylcyclohexane either alone or in admixture. Particularly suitable aromatic diisocyanates include 1,4-diisocyanatobenzene, 1,1'-methylenebis[4-isocyanatobenzene], 2,4-diisocyanato-1-methylbenzene, 1,3-diisocyanato-2-methylbenzene, 1,5-diisocyanatonaphthalene, 1,1'-(1-methylethylidene)bis[4-isocyanatobenzene], 1,3- and 1,4-bis(1-isocyanato-1-methylethyl)benzene, either alone or in admixture. Aromatic polyisocyanates containing 3 or more isocyanate groups may also be used such as 1,1', 1''-methylidynetris[4-isocyanatobenzene] and polyphenyl polymethylene polyisocyanates obtained by phosgenation of aniline/formaldehyde condensates. The polyols containing at least two isocyanate reactive groups may be polyester polyols, polyether polyols, polycarbonate polyols, polyacetal polyols, polyesteramide polyols or polythioether polyols. The polyester polyols, polyether polyols and polycarbonate polyols are preferred.

Suitable polyester polyols which may be used include the hydroxyl-terminated reaction products of polyhydric, preferably dihydric alcohols (to which trihydric alcohols may be added) with polycarboxylic, preferably dicarboxylic acids or their corresponding carboxylic acid anhydrides. Polyester polyols obtained by the ring opening polymerization of lactones such as e-caprolactone may also be included.

The polycarboxylic acids which may be used for the formation of these polyester polyols may be aliphatic, cycloaliphatic, aromatic and/or heterocyclic and they may be substituted (e.g. by halogen atoms) and saturated or unsaturated. As examples of aliphatic dicarboxylic acids, there may be mentioned, succinic acid, glutaric acid, adipic acid, suberic acid, azelaic acid, sebacic acid and dodecanedicarboxylic acid. As an example of a cycloaliphatic dicarboxylic acid, there may be mentioned hexahydrophthalic acid. Examples of aromatic dicarboxylic acids include isophthalic acid, terephthalic acid, ortho-phthalic acid, tetrachlorophthalic acids and 1,5-naphthalenedicarboxylic acid. Among the unsaturated aliphatic dicarboxylic acids which may be used, there may be mentioned fumaric acid, maleic acid, itaconic acid, citraconic acid, mesaconic acid and tetrahydrophthalic acid. Examples of tri- and tetracarboxylic acids include trimellitic acid, trimesic acid and pyromellitic acid.

The polyhydric alcohols which may be used for the preparation of the polyester polyols include ethylene glycol, propylene glycol, 1,3-propanediol, 1,3-butanediol, 1,4-butanediol, 1,5-pentanediol, 1,6-hexanediol, neopentyl glycol, diethylene glycol, dipropylene glycol, triethylene glycol, tetraethylene glycol, dibutylene glycol, 2-methyl-1, 3-pentanediol, 2,2,4-trimethyl- 1,3-pentanediol, 1,4-cyclohexanedimethanol, ethylene oxide adducts or propylene oxide adducts of bisphenol A or hydrogenated bisphenol A. Triols or tetraols such as trimethylolethane, trimethylolpropane, glycerine and pentaerythritol may also be used. These polyhydric alcohols are generally used to prepare the polyester polyols by polycondensation with the above-mentioned polycarboxylic acids, but according to a particular embodiment they can also be added as such to the reaction mixture.

Suitable polyether polyols include polyethylene glycols, polypropylene glycols and polytetraethylene glycols.

Suitable polycarbonate polyols which may be used include the reaction products of diols such as 1,3-propanediol, 1,4-butanediol, 1,6-hexanediol, diethylene glycol, triethylene glycol or tetraethylene glycol with phosgene, with diarylcarbonates such as diphenylcarbonate or with cyclic carbonates such as ethylene and/or propylene carbonate.

Suitable polyacetal polyols which may be used include those prepared by reacting glycols such as diethyleneglycol with formaldehyde. Suitable polyacetals may also be prepared by polymerizing cyclic acetals.

The active hydrogen-containing chain extender which may optionally be used is suitably an aliphatic, alicyclic, aromatic or heterocyclic primary or secondary polyamine having up to 80, preferably up to 12 carbon atoms, or water. In the latter case, a fully reacted polyurethane polymer is obtained with no residual free isocyanate groups.

Where the chain extension of the polyurethane prepolymer is effected with a polyamine, the total amount of polyamine should be calculated according to the amount of isocyanate groups present in the polyurethane prepolymer in order to obtain a full, reacted polyurethaneurea polymer with no residual free isocyanate groups; the polyamine used in this case has an average functionality of 2 to 4, preferably 2 to 3.

The degree of non-linearity of the polyurethaneurea polymer is controlled by the functionality of the polyamine used for the chain extension. The desired functionality can be achieved by mixing polyamines with different amine functionalities. For example, a functionality of 2.5 may be achieved by using equimolar mixtures of diamines and triamines.

Examples of such chain extenders useful herein include hydrazine, ethylene diamine, piperazine, diethylene triamine, triethylene tetramine, tetraethylene pentamine, pentaethylene hexamine, N,N,N-tris(2-aminoethyl)amine, N-(2-piperazinoethyl)ethylenediamine, N,N'-bis(2-aminoethyl)piperazine, N,N,N'-tris(2-aminoethyl) ethylenediamine, N-[N-(2-aminoethyl)-2-aminoethyl]-N'-(2-aminoethyl)piperazine, N-(2-aminoethyl)-N'-(2-piperazinoethyl)ethylenediamine, N,N-bis(2-aminoethyl)-N-(2-piperazinoethyl)amine, N,N-bis(2-piperazinoethyl) amine, guanidine, melamine, N-(2-aminoethyl)-1,3-propanediamine, 3,3'-diaminobenzidine, 2,4,6-triaminopyrimidine, dipropylenetriamine, tetrapropylenepentamine, tripropylenetetramine, N,N-bis(6-aminohexyl)amine, N,N'-bis(3-aminopropyl) ethylenediamine, 2,4-bis(4'-aminobenzyl)aniline, 1,4-butanediamine, 1,6-hexanediamine, 1,8-octanediamine, 1,10-decanediamine, 2-methylpentamethylenediamine, 1,12-dodecanediamine, isophorone diamine (or 1-amino-3-aminomethyl-3,5,5-trimethyl-cyclohexane), bis(4-aminocyclohexyl)methane [or bis(aminocyclohexane-4-yl)-methane] and bis(4-amino-3-methylcyclohexyl)methane [or bis(amino-2-methylcyclohexane-4-yl)methane], polyethylene imines, polyoxyethylene amines and/or polyoxypropylene amines (e.g. Jeffamines from TEXACO).

The total amount of polyamines should be calculated according to the amount of isocyanate groups present in the polyurethane prepolymer. The ratio of isocyanate groups in the prepolymer to active hydrogens in the chain extender during the chain extension is in the range of from about 1.0:0.7 to about 1.0:1.1, preferably from about 1.0:0.9 to about 1.0:1.02 on an equivalent basis.

Preferably, the polyisocyanate is a diisocyanate and more preferably it is selected from 1,1'-methylenebis-[4-isocyanatobenzene]and 1,1'-methylenebis-[4-isocyanatocyclohexane].

Preferably the polyol is a polyethyleneglycol selected from ethyleneglycol, polyethyleneglycol, polytetramethyleneglycol and the like, eventually in admixture with other polyether polyols.

Even more preferably, the polyethylene glycol has a very low molecular weight (from 300 to 900). This is rather unconventional as usually the polyurethanes incorporate polyethylene glycol with a molecular weight above 2000 in order to achieve the well known properties of the polyurethanes (long soft and hard segments, melting point, strength). Breathability is also known to decrease with the molecular weight of the polyethylene glycol. However, in this embodiment, the low molecular weight of the polyethylene glycol is supposed to be responsible for the amelioration of the flux.

Preferably the chain extender is isophorone diamine (or 1-amino-3-aminomethyl-3,5,5,-trimethylcyclohexane) alone or in admixture with hydrazine.

The second layer can be applied to the support layer by coating from a solution, lamination, extrusion coating or in-situ polymerization onto either or both surfaces of the support membrane.

The composite membrane according to the invention is mainly intended and devised for osmotically driven ultrafiltration, but other uses of the membrane according to the invention includes reverse osmosis application, vacuum or pressure filtration, biological separation (e.g. virus separation from body fluids), gas separation, effluent treatment, water filtration, control drug release system, etc.

The membranes of the invention are particularly suited for osmotically driven ultrafiltration as they permit to lower the MWCO to a level low enough to prevent dialysis to interfere with osmosis, while the flux remains acceptable. A broader range of solute with a lower MWCO can thus be prevented from leaving through the filtration membrane. A typical application of this particular process is a self rehydrating closed osmotic bag. This bag consists of a container comprising as external wall the composite semi-permeable membrane structure according to the invention and a solute to be rehydrated retained into said container. In another embodiment of the invention. the new membrane is just a portion of the external wall. Suitable container properties are disclosed in detail in EP 360612.

The container retains the solute either as a solid or a concentrated solution. When the closed bag is contacted with water, water diffuses throughout the membrane and brings the solute in solution (very limited phenomenon). Once a highly concentrated solution is obtained in the bag, osmosis takes over and literally pumps external water into the bag. It is therefore a prerequisite that at least one water soluble solute is present in the bag for osmosis to occur.

Either the solute comprises water soluble compounds with a molecular weight higher than the low MWCO of the second membrane, thus allowing to prepare solute solutions such as rehydrated nutritional substances like milk powder or fruit juice, rehydrated blood products, medicaments or oral rehydration compositions or the solute only comprises water soluble compounds with a molecular weight lower than the low MWCO of the second membrane, thus allowing to prepare substantially pure water, which can be used for medical purposes for example.

In a particularly advantageous variant, the solute may comprise a mixture of water soluble compounds with molecular weights higher and lower than the MWCO of the second layer. In this case, the compounds with a molecular weight lower than the MWCO of the second layer contribute mainly to initiate promptly the osmosis phenomenon, while the final solution consists essentially of the compounds having a molecular weight higher than the MWCO of the second layer.

The following examples are given for the purpose of illustrating the present invention.

EXAMPLES

1. Material for the second layer.

1.1 Commercial materials 1.1.1 Nitrocellulose grade A 500 (BAYER AG)

1.1.2 Nitrocelllulose DML 30/50 (ICI)

1.2 Specifically devised material 1.2.1 A solution of 85.50 g of a polyethyleneglycol (PEG 2000 (INSPEC)) having a molecular weight of about 2000, 72.80 g of a poly(tetramethyleneglycol) (TERATHANE 2000 (DUPONT)) having a molecular weight of about 2000, 21.24 g of ethyleneglycol and 105.46 g of 1,1'-methylenebis (4-isocyanatobenzene) in a mixture of 420 g of dimethylformamide and 65 g of methylethylketone is introduced into a 2-liter four necked round bottomed flask equipped with a mechanical stirrer, a thermometer, an air condenser, a nitrogen inlet and a dropping funnel. The mixture is heated at 90° C. while stirring and 0.15 g of tin 2-ethylhexanoate (DABCO T9 (AIR PRODUCTS)) as catalyst, is introduced. The reaction mixture is maintained at 90° C. for 2 hours and then cooled.

120 g of methylethylketone are then introduced into the reaction vessel.

1.2.2 A solution of 133.02 g of polyethyleneglycol (PEG 600 (HOECHST)) having a molecular weight of about 600 and 79.00 g of 1,1'-methylenebis(4-isocyanatocyclohexane) in 342.00 g of toluene is introduced into a 2-liter four necked round bottomed flask equipped with a mechanical stirrer, a thermometer, an air condenser, a nitrogen inlet and a dropping funnel.

The mixture is heated at 90° C. while stirring and 25 mg of dibutyltinlaurate (DABCO T12 (AIR PRODUCTS)), as catalyst, is introduced. The reaction mixture is maintained at 90° C. for 6 hours and then cooled.

A solution of 13.68 g of isophrone diamine in 350.00 g of isopropyl alcohol is introduced in a second 2-liter four necked round bottomed flask equipped with a mechanical stirrer, a thermometer, an air condenser, a nitrogen inlet and a droppind funnel.

The content of the first flask is cooled at room temperature and is then added slowly to the mixture alcohol/amine (second flask). Chain extension is complete after about 3 hours. 44.2 g or fumed silica (TS100 DEGUSA) and 50 g of toluene are added to the mixture.

1.2.3 A solution of 114.40 g of polyethyleneglycol having a molecular weight of about 400 (PEG 400 (HOESCHT)), 20.60 g of poly(tetramethyleneglycol) having a molecular weight of about 1000 (TERATHANE 1000 (DUPONT)) and 106.80 g of 1,1'-methylenebis(4-isocyanatocyclohexane) in 342.00 g of toluene is introduced into a 2-liter four necked round bottomed flask equipped with a mechanical stirrer, a thermometer, an air condenser, a nitrogen inlet and a dropping funnel.

The rest of the process is as in example 1.2.2 but the isopropyl alcohol is replaced with ethyl alcohol, the isophorone diamine is replaced with a mixture of 11.35 g of isophorone diamine and 7.12 g of an aqueous solution of hydrazine (15% (w)) and the toluene is replaced with ethylacetate.

2. Preparation of the membrane.

Membranes have been prepared by coating regenerated cellulose films (thickness of around 35 μm) with different molecular weight cut-off with the different materials cited at point 1. The coating (about 1 μm (dry)) are applied by direct gravure coating at 10 g/m2 (wet weight). The following membranes have been prepared

TABLE I

|  | Material of example: | | | | |
| --- | --- | --- | --- | --- | --- |
|  | No coating | 1.1.1 | 1.2.1 | 1.2.2 | 1.2.3 |
| RCF MWCO 1800 (viscose 9.5%) | 2.1 (1) | 2.3 | 2.4 | 2.7 | 2.10 |
| RCF MWCO 2500 (viscose 7.5%) |  |  | 2.5 | 2.8 | 2.11 |
| RCF Mwco 2500 (viscose 6%) | 2.2(1) |  | 2.6 | 2.9 | 2.12 |

RCF: regenerated cellulose film
(1): by way of comparison

3. Preparation of osmotic bag

Bags have been prepared from the membranes made out at example 2.

The following solute compositions have been prepared:

A. Sucrose 38 g

Sodium citrate dihydrate 2.9 g

A2 Sucrose 76 g

Sodium citrate dihydrate 5.8 g

B. Sucrose 35 g

Sodium citrate dihydrate 2.9 g

C. Sucrose 27 g

Sodium citrate dihydrate 1.7 g

D. Sucrose 29 g

Sodium citrate dihydrate 2.9 g

Rectangular closed bags having dimension of 210×110 mm containing the compositions A, A2, B or C have been prepared:

3.1 membrane prepared at example 2.1 filled with composition A (1);

3.2 membrane prepared at example 2.1 filled with composition A2(1);

3.3 membrane prepared at example 2.2 filled with composition A (1);

3.4 membrane prepared at example 2.2 filled with composition A2(1);

3.5 membrane prepared at example 2.7 (coating on the inner side of the bag) filled with composition B;

3.6 membrane prepared at example 2.9 (coating on the inner side of the bag) filled with composition D;

3.7 membrane prepared at example 2.11 (coating on the inner side of the bag) filled with composition C;

3.8 membrane prepared at example 2.12 (coating on the inner side of the bag) filled with composition C;

(1) by way of comparison

4. Preparation of purified solutions

The bags prepared at example 3 are immersed in water which contains *E. Coli* (NCI.B86 wild type around 5.6×106 cfu/ml).

The following table shows the results

TABLE II

| Bag | time to reach the equilibrium in the required level | final concentration in | | | final conc. in bacteria in external water |
| --- | --- | --- | --- | --- | --- |
| | | volume | sucrose | losses by dialysis | sodium citrate | |
| 3.1 | 24 h | 267.8 ml | 44.7 g/l | 68% | 3.16 g/l | 1.108 cfu/ml |
| 3.2 | 24 h | 503.0 ml | 58.8 g/l | 61% | 3.66 g/l | — |
| 3.3 | 24 h | 295.6 ml | 41.6 g/l | 67% | 3.0 g/l | — |
| 3.4 | 24 h | 574 ml | 46.8 g/I | 65% | 3.18 g/l | — |
| 3.5 | 17.5 h | 499.4 ml | 32.2 g/l | 54% | 3.2 g/l | — |
| 3.6 | 8 h | 518 ml | 42 g/l | 19% | 2.92 g/l | — |
| 3.7 | 9 h | 500 ml | 42 g/l | 23% | 3.0 g/l | — |
| 3.8 | 9.5 h | 496.4 mI | 42 g/l | 23% | 3.0 g/l | — |

It appears from Table II that in the absence of the second membrane, the increase in MWCO results in a better flux (after an equivalent period of time, the bag with the largest MWCO contains 10% more water). In both cases, the lost of solute are ven, important (about 70%).

It is also noted that with a second membrane, the flux is more than doubled, which results in a greater volume collected in the bag in a shorter period of time. It is also noted that in this case the lost of solute is considerably lowered.

Finally it appears clearly from the comparison between the bags 3.5 and 3.8 that the best results are obtained when the membrane has been made with a first support layer with large pores which has been coated with a second layer of hydrophilic polyurethane.

What is claimed is:

1. Container for the preparation of rehydrated solute solutions, rehydrated blood or blood substitutes, nutritional solutions, solutions for medical purpose or of pure water comprising a flexible semi-permeable membrane and at least one water soluble solid retained therein, wherein the flexible semi-permeable membrane is a composite membrane structure having a low molecular weight cut-off, comprising a flexible support layer thick enough to give strength to the membrane structure and having a molecular weight cut-off from 1,000 to 50,000, and on at least one surface of the said support layer, a second layer having a molecular weight cut-off from 300 to 2,000 and being thin enough to allow a flux of at least 0.1 l/hr.m$^2$.bar.

2. Container according to claim 1 wherein the wall of said container consists essentially of said flexible semi-permeable membrane.

3. Container according to claim 1 wherein only a portion of the wall consists of said flexible semi-permeable membrane.

4. Container according to claim 1 wherein the support layer of the membrane is a semi-permeable material selected from the group consisting of cellulose, regenerated cellulose, benzoylated cellulose and collagen.

5. Container according to claim 1 wherein the second layer of the membrane is a film of a material selected from the group consisting of cellulose derivative, synthetic organic polymer, naturally occurring polymer, modified naturally occurring polymer, and a mixture thereof.

6. Container according to claim 5 wherein the second layer of the membrane is a hydrophilic polyurethane film.

7. Container according to claim 1 wherein the second layer of the membrane is applied on at least one surface of said support layer by a process selected from solution coating, lamination, extrusion coating and in-situ polymerization.

8. Container according to claim 1 wherein the second layer of the membrane is applied on both surfaces of said support layer.

9. Process for the preparation of rehydrated solute solution of rehydrated blood or blood substitutes, of nutritional solutions, of solutions for medical purpose, or of pure water, wherein a container according to claim 1 is placed in water.

10. Process for the preparation of a rehydrated solute solution, of rehydrated blood or blood substitute, of a nutritional solution, of a solution for medical purpose or of pure water with a container according to claim 1 wherein said container is placed for a sufficient period of time in flowing or stagnant water.

* * * * *